United States Patent [19]

McCombs

[11] Patent Number: 4,826,510
[45] Date of Patent: May 2, 1989

[54] PORTABLE LOW PROFILE DC OXYGEN CONCENTRATOR

[75] Inventor: Norman R. McCombs, Tonawanda, N.Y.

[73] Assignee: The John Bunn Company, Tonawanda, N.Y.

[21] Appl. No.: 143,325

[22] Filed: Jan. 13, 1988

[51] Int. Cl.$^4$ .............................................. B01D 53/04
[52] U.S. Cl. ........................................ 55/179; 55/267; 55/357; 55/475; 128/204.18; 128/205.11; 128/205.12; 128/205.27
[58] Field of Search .................... 55/18, 20, 21, 25, 26, 55/68, 75, 161–163, 179, 387, 389, 475, 267, 357; 128/204.18, 205.11, 205.12, 205.24, 205.26, 205.27

[56] References Cited

U.S. PATENT DOCUMENTS

| | | | |
|---|---|---|---|
| 2,586,670 | 2/1952 | Lambertsen | 55/475 X |
| 3,008,540 | 11/1961 | Gibson, Jr. | 55/475 X |
| 3,483,677 | 12/1969 | Pinto | 55/475 X |
| 4,272,265 | 6/1981 | Snyder | 55/389 |
| 4,302,224 | 11/1981 | McCombs et al. | 55/160 |
| 4,342,573 | 8/1982 | McCombs et al. | 55/161 |
| 4,349,357 | 9/1982 | Russell | 55/389 X |
| 4,373,938 | 2/1983 | McCombs | 55/389 X |
| 4,449,990 | 5/1984 | Tedford, Jr. | 55/179 X |
| 4,487,617 | 12/1984 | Dienes et al. | 55/163 |
| 4,491,459 | 1/1985 | Pinkerton | 55/163 |
| 4,496,376 | 1/1985 | Hradek | 55/389 X |
| 4,502,873 | 3/1985 | Mottram et al. | 55/179 |
| 4,511,377 | 4/1985 | McCombs | 55/163 |
| 4,576,616 | 3/1986 | Mottram et al. | 55/68 |
| 4,584,001 | 4/1986 | Dechene | 55/162 |
| 4,627,860 | 12/1986 | Rowland | 55/179 X |
| 4,648,888 | 3/1987 | Rowland | 55/389 X |
| 4,661,124 | 4/1987 | Hamlin et al. | 55/389 X |
| 4,673,420 | 6/1987 | Haker et al. | 55/179 |
| 4,681,099 | 7/1987 | Sato et al. | 55/179 X |
| 4,698,072 | 10/1987 | Rohde et al. | 55/31 |
| 4,698,075 | 10/1987 | Dechene | 55/163 |
| 4,737,170 | 4/1988 | Searle | 55/475 X |

FOREIGN PATENT DOCUMENTS 1262641  4/1961  France ..................... 55/475

Primary Examiner—Robert Spitzer
Attorney, Agent, or Firm—Roylance, Abrams, Berdo & Goodman

[57] ABSTRACT

A portable PSA device having a combination of features including a demand device to thereby limit the necessary size of the PSA unit itself; an improved spring loaded bed to permit horizontal use, and an arrangement of parts overall to produce a low profile, low center of gravity compact unit particularly suitable for use in automobiles and of sufficiently low power demand to be powered by the cigarette lighter socket of automobiles.

42 Claims, 4 Drawing Sheets

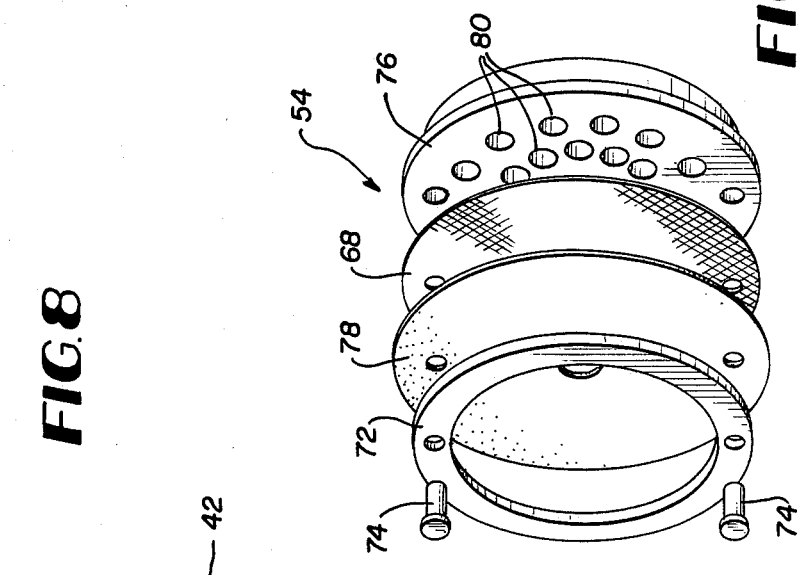
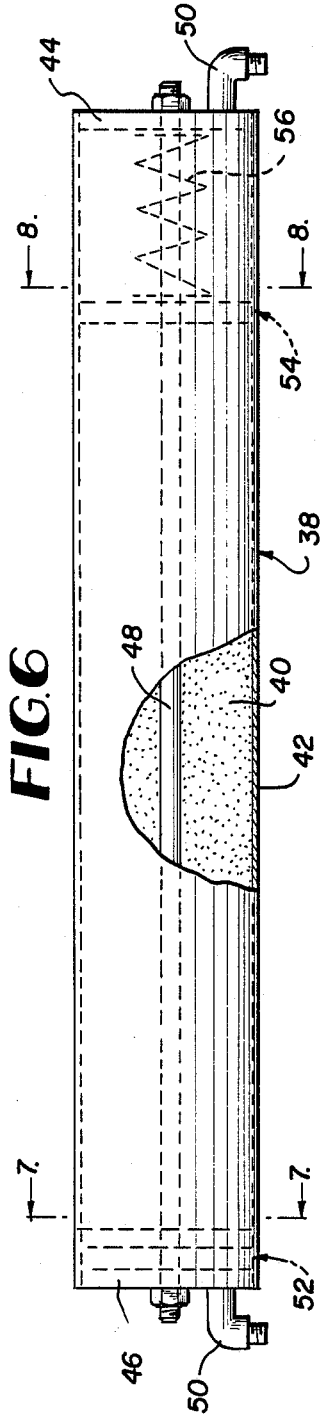
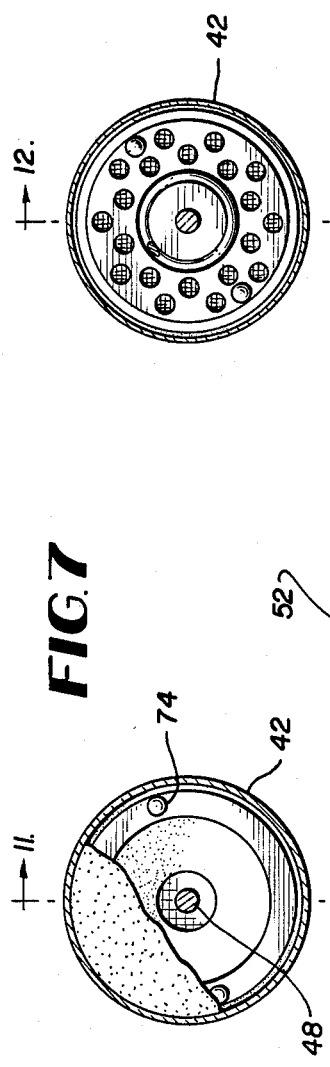
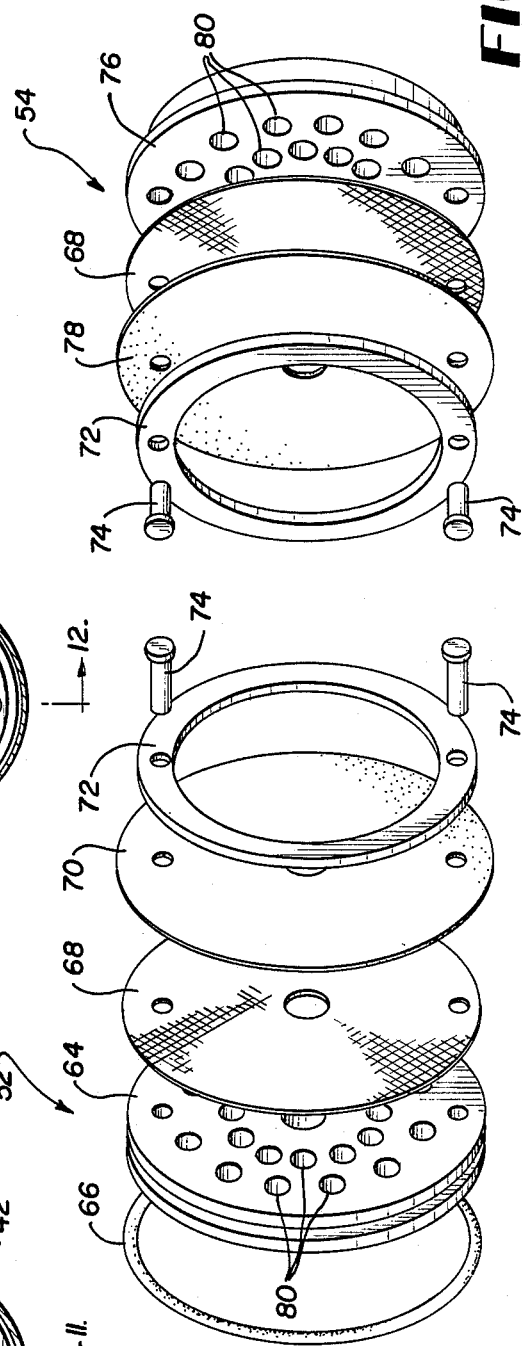

PORTABLE LOW PROFILE DC OXYGEN CONCENTRATOR

FIELD OF THE INVENTION

This invention pertains to an oxygen concentrator using PSA (pressure swing adsorption) technology. While the invention could be used to separate any gas out of a mixture of gases, it is been particularly designed for separating and concentrating oxygen out of air, and to supply this concentrated oxygen to patients suffering various respiratory ailments. More in particular, the invention relates to such a device having a particular combination of features making it uniquely suitable for use in automobiles and airplanes, i.e., a portable oxygen concentrator.

BACKGROUND OF THE INVENTION

Making oxygen concentrators portable has been an old and long standing problem in this art. There have been sold, and continue to be sold, converters which will convert DC as is available in automobiles and other vehicles, to AC so that a unit designed for the home could also be used in the car. The problems with this are that the unit was relatively large, it tended to fall over, and the adapter system drained excessive energy from the car's electrical system. In addition, such adapters were relatively expensive and required additional expense and effort to install into the car. Thus, an object of the invention is to avoid the need for such DC to AC adapter systems, also known as inverters.

The prior art includes some machines designed for DC operation. The problems here include that such machines tended to be of a high profile so that they were unstable in moving vehicles, and, in addition, power consumption was still a problem. Such machines were designed to be plugged into the automobile cigarette lighter socket. However, in addition to the power consumption problem, this time it includes a dangerous fire hazard. Because the amperage required by such DC oxygen concentrators was greater than the design maximum of the cigarette lighter's socket, there was a severe danger of a fire in the automobile's wiring.

Yet another problem in the prior art concerning the use of such AC to DC inverters and DC machines is that many patients require relatively high flows of oxygen. That is, the sicker the patient the more oxygen he or she requires, and thus the harder the machine must work to provide the increased oxygen. This tendency among patients to require more oxygen further aggravates the already severe power consumption problem in such prior art devices.

An approach in the prior art which also failed was to simply put a DC compressor in an otherwise existing AC machine. This turned out to be not workable because oxygen concentrators designed for home or stationary use usually have vertical beds. For a portable unit for use in vehicles, the unit must have a low profile and a low center of gravity in order to not be upset during normal motion of the vehicle. Further, on airplanes the unit must have a low profile in order to fit under an airplane seat. In automobiles, the unit must fit in the foot well of the vehicle, often in the back seat. The unit must be able to be used with all sizes of automobiles including the smaller automobiles. Thus, simply putting a DC compressor in an existing home unit did not work because the unit was unstable and because it would not fit into the vehicle in the manner required, as set forth above.

Providing portable oxygen for respiratory patients has been attempted using many forms of stored oxygen. All such schemes that depend upon storing oxygen have inherent disadvantages which are overcome by concentrators inherently.

In aircraft, bottles of oxygen are potential explosion hazards and thus are to be avoided. In fact, many airlines refuse to allow such pressurized cylinders of oxygen or any other gas on-board.

Airlines are accustomed to working with chlorate candles of various sorts. However, these schemes are undesirable because they involve ignition and burning, processes highly undesirable on aircraft, and also undesirable in automobiles. Further, chlorate candles are relatively expensive and produce a great deal of heat. In general, they are a very dangerous way to store oxygen.

Summarizing, any system that depends upon the storage of oxygen inherently has problems. If the oxygen is stored chemically, getting it out of its chemical "lock" usually produces heat and other undesirable side effects. If the oxygen is stored as a gas under pressure, pressurized vessels are dangerous and undesirable for transport in any sort of vehicle. Further, stored oxygen upsets the air balance inside the vehicle, and this is especially important when considering pressurized aircraft flying at high altitudes. Oxygen concentrators do not change the balance or mixture of the air. That last statement is true, even though it may not seem logical at first. Tests have proved that oxygen concentrators do not upset the air balance or air mixture in the space in which they are used.

The invention achieves its low profile using a unique combination of features, one of which is to position the beds in a horizontal orientation. The PSA art has long known that horizontal beds are susceptible to channeling of gas through the bed, which in turn permits fluidization of the sieve material followed by rapid destruction of the molecular sieve material in the bed.

While spring loaded beds have been used in other environments, they are new in this environment of a low profile portable PSA unit. The spring loaded bed keeps the sieve tightly packed even as it normally breaks down slightly in use. Further, improved means to achieve this end are also provided.

The prior art, in general, has not had a fully acceptable portable medical oxygen concentrator. The present invention fills that need with an efficient machine which is durable and well suited to the rigors of portability and use in vehicles of all sorts.

FEATURES AND ADVANTAGES OF THE INVENTION

The invention provides a DC unit thus allowing use of state of the art converter technology to permit use in the home. That is, the patient can take his portable DC machine with him and plug it into the cigarette lighter socket of the car. On aircraft, it is envisioned that special seats will be provided having electrical outlets into which such machines can be plugged in. In other vehicles, such as ambulances, golf carts, helicopters, mobile wheel chairs, boats, or any other vehicle having on-board electrical power, suitable accommodations can be easily made to adapt to DC use. In the home, the patient would have a converter, similar to the small converters that are used to power radios, tape recorders, and the like, but of course suitably upgraded for the greater power demand and for improved reliability. He would use this converter as a transformer with the machine in the home. This is deemed a substantial advantage for the patient and the manufacturer.

It is also a substantial advantage for the manufacturer because automobile use is a large market which has not been heretofore adequately served. Further, insurance may not cover use in a car, but if the machine is basically a home use machine which is also portable, then the patient can be reimbursed from the various insurance plans which do cover home oxygen concentrators.

The invention machine is designed to be highly efficient to thus permit use in automobiles at or below the maximum power rating of the cigarette lighter socket. This is accomplished in two ways. The first way is to optimize the weight and size of the beds and cycle used within the oxygen concentrator machine itself. That facet is taught in the prior art in general, and all of such teachings which make for more efficient PSA machines, beds and cycles are usable in conjunction with the invention.

The second facet of the improved efficiency of the invention has to do with use of some sort of demand device. A demand device is a mask or cannula which the patient wears on his or her face. The inhalation effort by the patient triggers the flow of oxygen. In this manner, oxygen is only provided when it is required by the patient's inhalations, and not during the entire running time of operation. This is a large part of the improved efficiency of the invention. Many such demand devices are available and usable with the invention. Since inhalation occurs during only about 30% to about 40% of the total time of each respiration cycle, it is clear that substantial savings in oxygen to be supplied by the machine is achieved. This savings translates into decreased size, increased efficiency and decreased power consumption for machines made according to this invention.

Inclusion of a demand device produces an additional advantage of improved safety. If a cannula should fall from a patient's face in a situation where the cannula is supplied with a steady pressurized flow of oxygen, the oxygen from the cannula will literally "soak" the patient's clothing, greatly increasing the risk of combustion. This is especially so with wool more than other fabrics, but it is a real risk in every case. The inclusion of a demand device, in addition to allowing the use of a smaller and thus more efficient machine, eliminates this risk of fire.

During the development of the invention, an effort was made to arrange the components of the machine with the beds positioned under the compressor. This produced an overall height that was such that the machine was not stable in use in an automobile or other moving vehicle. In the present invention, the beds and the compressor are in a side by side relationship. Thus, all prior art arrangements having the compressor and beds arranged vertically with respect to each other are outside the teaching of the present invention, and have inherent problems which are overcome by the invention.

Along with providing a machine having a generally low profile, the invention also provides that the air flow through the machine is from side to side, that is, along the long dimension. With this same goal in mind, the handle and the control panel are positioned in the top long face, and parallel to the longitudinal axis of the machine. Having the air flow along the long axis and from side to side puts the air inlet and air outlet on the sides corresponding to the sides of the automobile. Thus, there is less likely to be any blockage of the air flow through the machine than there would be if the air flow was forward and back with respect to the vehicle.

This is so because it is anticipated that the machine of the invention will be used very frequently in automobiles, and will be transported on the floor of the automobile in a foot well. With the louvers arranged in this manner, there is no motivation for the patient or user to put the machine in the car other than in the configuration which would produce the inherently unblocked side to side flow. The user or patient would have to make an extra effort to place the machine wrong in the car. That is, he would have to turn it 90 degrees, twist his hand, and put the controls in a less accessible position. Thus, the elongated low profile configuration encourages positioning of the machine in an automobile in the correct position for proper usage and air flow.

The above and other advantages of the invention will be pointed out or will become evident from the following detailed description and claims, and in the accompanying drawing also forming a part of this disclosure.

BRIEF DESCRIPTION OF THE DRAWING

FIG. 6 is a partially broken away side elevational view of the improved spring loaded bed of the invention;

FIG. 7 is a cross-sectional view taken on line 7—7 of FIG. 6;

FIG. 8 is a cross-sectional view taken on line 8—8 of FIG. 6;

FIGS. 9 and 10 are companion views showing the working parts at the two ends of the spring loaded bed of FIG. 6;

DETAILED DESCRIPTION OF THE PREFERRED EMBODIMENTS

Figure 1:
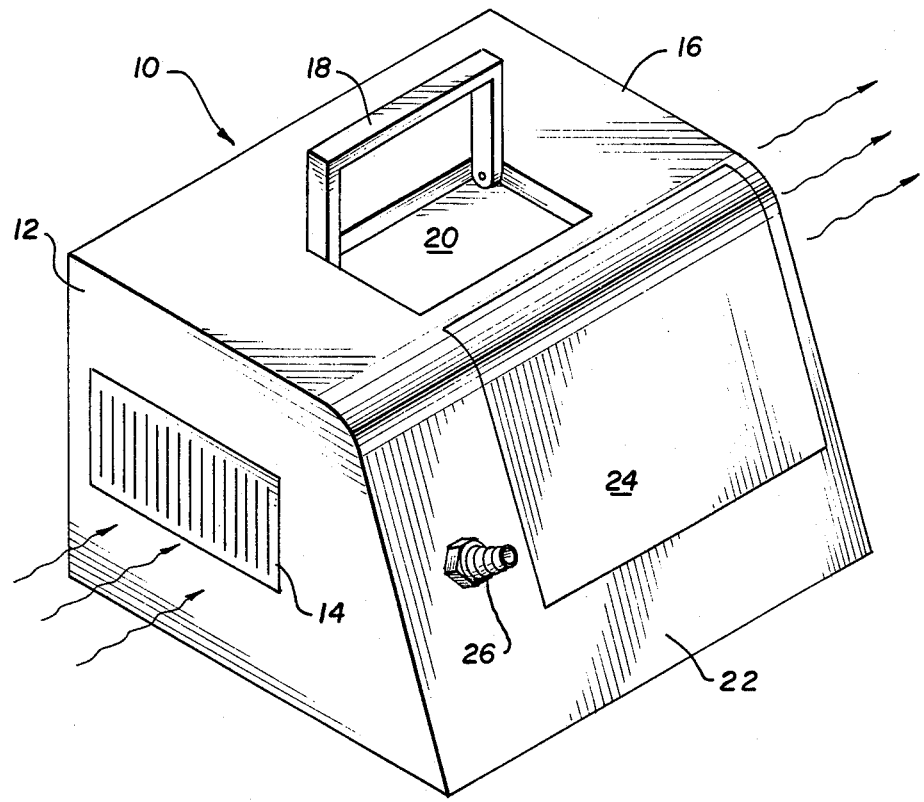
FIG. 1 is a perspective view of a machine embodying the invention showing the air flow through the machine.

FIG. 1 shows an external three quarter perspective view of a PSA unit 10 embodying the invention. FIGS. 2 through 5 show the internal arrangement of parts in this unit 10.

Figure 2:
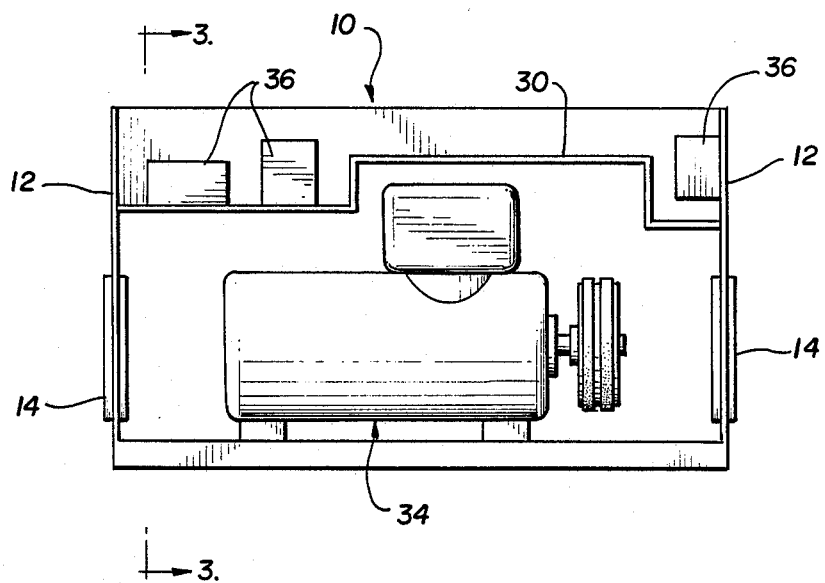
FIG. 2 is a rear side elevational view of the machine of FIG. 1 looking in the direction of arrow 2 on FIG. 3 with the cover removed.

As is clear from FIGS. 1 through 5, the portable unit 10 is of a generally short squat configuration, and is elongated from side to side. The air flow through the machine is from side to side, and through the louvers 14 in the side walls 12 as shown in FIGS. 1 and 2. Similar air exit louvers are on the other side and are indicated by the air flow arrows on FIG. 1, and are shown in FIG. 2.

The unit 10 of the invention is portable, and was designed especially for use in automobiles and airplanes. The sieve beds needed for the PSA process are positioned horizontally (see FIGS. 3, 4, 5 and description below), and thus the unit is provided with an overall low profile and low center of gravity. This configuration tends to keep the machine stable in a moving automobile, and provides a total height such that it will fit under an aircraft seat. By having the flow from side to side, the "foot print" of the unit is such that it will fit in the foot well of most automobiles. With this configuration, dictating this positioning in the foot well of an automobile, there tends to be no blockage of the air flow through the louvers 14. That is, if the unit were more square, and could be put in the foot well of the automobile with the air flow either from side to side or front to rear of the car. However, the front to rear orientation might result in a blockage, that is, louver could be flush against a seat.

The same concept, that is, use in automobiles and airplanes, is further enhanced by the positioning of the folding handle 18 in its well 20 in the top wall 16 of the unit. That is, imagining a user grasping the handle 18 as it is shown in FIG. 1, such user would have to turn his wrist to an unnatural and uncomfortable position in order to position the machine 10 in other than the desired position with the side to side air flow.

The front wall 22 is sloped (see FIGS. 3 and 5) to allow space for the beds. A hinged door 24 is provided to normally cover other controls and provide an esthetic appearance when it is in place as shown in FIG. 1. Finally, an outlet 26 is provided to supply oxygen through a tube and usually a demand mask or a cannula to the patient.

Referring now to FIGS. 2 through 5 inclusive, the space inside the cabinet is divided into three separate parts by means of a vertical wall 28 which intersects a horizontal wall 30. The beds 32 are mounted to the front side of the wall 28 by any suitable means. A DC motor/compressor 34 is provided in the space below wall 30 and to the rear side of wall 28. As shown in FIG. 2, the wall 30 may have numerous steps in it in order to accommodate the shapes of the parts above and below the wall. The space above wall 30 is occupied by the various components and controls, indicated generally by reference numeral 36 in FIGS. 2 and 3.

The art of PSA gas separation is well developed, and the present invention can be used with many cycles known in the prior art. The particular PSA cycle employed is not per se a critical part of the invention. What is important is that the cycle be as efficient as possible in order to reduce power demand as much as possible, and to permit the use of as light weight and compact a machine as possible, in order to achieve the objects of the invention as set forth above.

Likewise, the various components, the compressor 34 and the other parts 36, represent a well developed art in and of themselves. The invention takes advantage of the state of the art of such parts, and such parts otherwise do not form a material part of the present invention.

Figure 3:
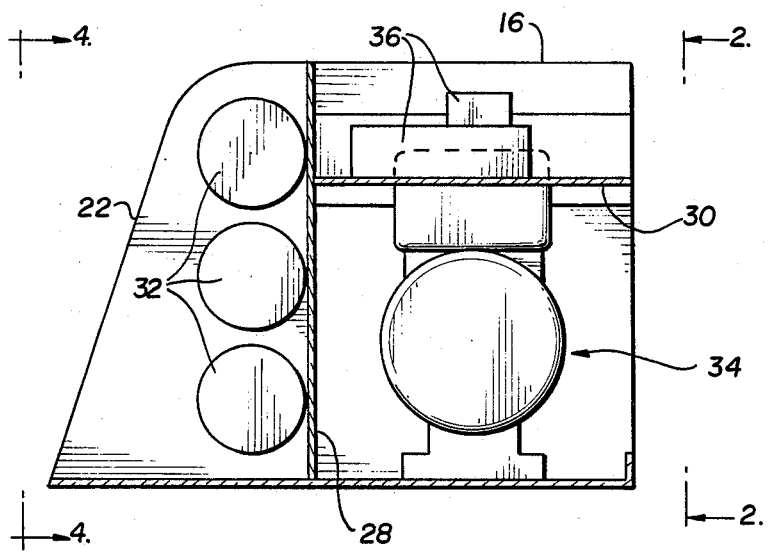
FIG. 3 is a cross-sectional view taken on line 3—3 of FIG. 2.

In FIG. 3 the beds 32 are shown in a straight vertical orientation. In FIG. 5, the same beds 32 are shown in a more nested arrangement, this arrangement of FIG. 5 permitting a further shortening of the overall height of the machine 10A of FIG. 5. The front wall 22 of FIGS. 1 through 4 is reconfigured as indicated at 22A in FIG. 5 for the same reason. Likewise, all of the other parts in FIG. 5 similar to those described above are indicated by the same reference numeral followed by "A". FIGS. 3 and 5 both show the side by side relationship of the beds and the motor/compressor, which enhances the low profile, low center of gravity, and stability of the invention device.

The improved spring loaded bed 38 of the invention is shown in side elevational view in FIG. 6 with a portion of the side wall broken away. Details of this bed 38 are shown in FIGS. 7 through 12.

In the present invention, it is necessary that the molecular sieve material 40 be immobilized. The danger to be avoided is fluidization of this sieve material 40. If the sieve material, which is, physically, roughly like fine sand but is much more delicate, were to be permitted to fluidize, then it would rapidly deteriorate and reduce itself to much finer useless powder-like particles. Fluidization of the sieve 40 is a real danger for several reasons. First of all, for efficiency, a very fine sieve material is preferably used at the start. That in and of itself makes the sieve material more susceptible to fluidization when subjected to air flows in use. Secondly, since the unit is portable, the shocks and motion normally experienced by a portable unit tend to enhance any slight looseness to permit further fluidization. Finally, since the bed is horizontal, the sieve material must be tightly contained and immobilized, otherwise channels will develop at the top of the bed due to gravity and settling of the material, and such channels will be the place where fluidization will begin.

While a spring loaded bed of molecular sieve is not per se new, providing such a bed using the unique features as set forth below, as well as providing such a bed in a horizontal orientation, and doing so in a portable machine, are all believed to be new.

Referring now in detail to FIGS. 6 through 12, the bed 38 is made up of a plain cylinderical tube 42, having a first end cap 44, a second end cap 46, and a tie rod 48 securing the two end caps 44 and 46 in their respective ends of the tube 42 by suitable threaded fastening means on both ends of the rod. Fittings 50 are provided through the two end caps 44 and 46 to permit the flow of gases through the end caps 44 and 46 into and out of the bed of sieve material 40.

Figure 11:
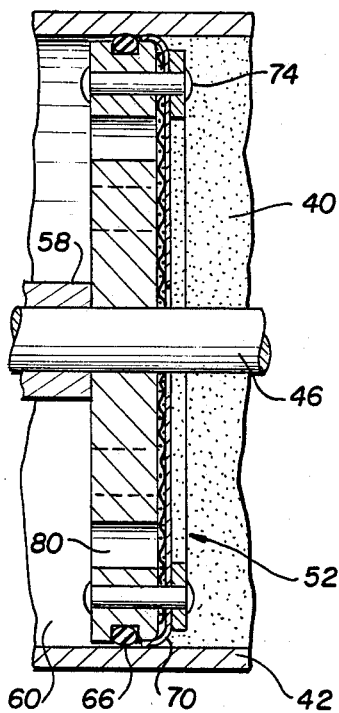
FIG. 11 is a cross-sectional view taken on line 11—11 of FIG. 7.
Figure 12:
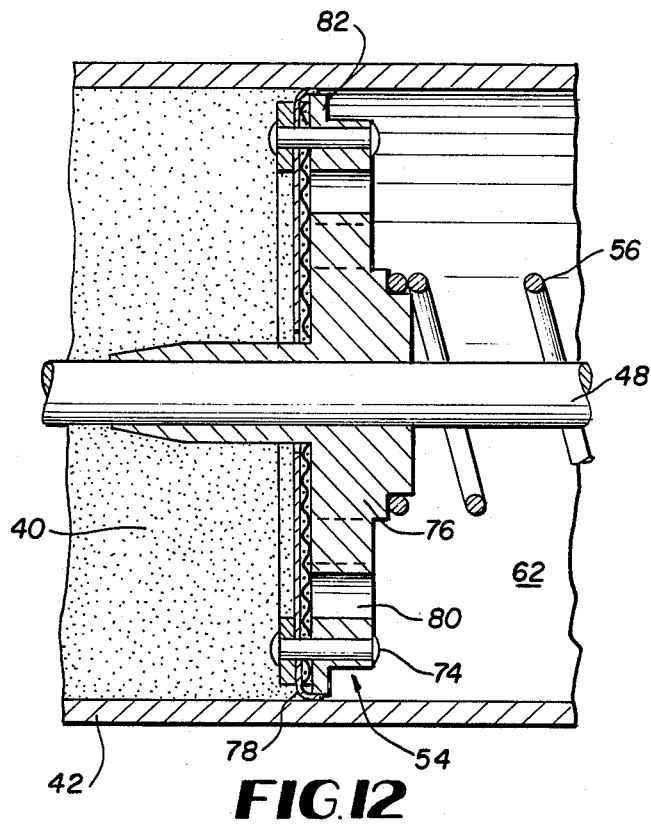
FIG. 12 is a cross-sectional view taken on line 12—12 of FIG. 8.

A stationary bed retainer assembly 52 is provided in closely spaced relation to the fixed end cap 46, and a moving retainer assembly 54 is provided in predetermined spaced relation to the end cap 44. A spring 56 is provided around the rod 48 and constantly urges the moving retainer assembly 54 to the left against the bed 40 and is anchored against the fixed cap 44. A spacer 58, see FIG. 11, is between end cap 46 and retainer assembly 52 to provide a plenum space 60 at that end of the bed. This plenum space 60 aids air distribution and air flow through the bed. A similar plenum space 62 is provided at the other end, see FIG. 12, and this plenum space 62 is larger than space 60 in that it has to accommodate the spring 56 as well as the changes in length of the bed during use.

The outside diameters of the end caps 44 and 46 are approximately equal to that of the tube 42. These end caps are stepped and provided with sealing means such as "O" rings in order to provide an air tight seal at each end and in order to provide physical integrity to the bed. That is, when the rod 48 is inserted through the end caps 44 end 46 and the nuts shown in FIG. 6 tightened, the entire assemblage is held snugly in place, and the spring 56 and the spacing means 58 bear against the inside assemblies 52 and 54. The spacer 58 may be either a separate member or an extension of the end cap 46.

FIGS. 7, 9, and 11 show the details of the stationary retainer assembly 52 and its appearance in use in the bed 38. Assembly 52 comprises a moving piston 64 fitted with a sealing "O" ring 66, a mesh screen 68, a disk of filter paper 70, a retaining ring 72, and a pair of rivets 74 which hold the entire assemblage together. The moving retainer assembly 54 comprises a moving piston 76, a mesh screen 68, a filter paper 78, and a retainer ring 72. Assembly 54 is likewise held together by more rivets 74.

The two mesh screens 68 are selected of a pore size based on criteria set forth below and in accordance with the size of the particles in the sieve bed 40. The two disks of filter paper 70 and 78 are of different diameters, for a reason which will be discussed below. It is also noteworthy that moving piston 76 does not include an "O" ring analogous to the "O" ring 66 of the stationary piston 64. Both pistons 64 and 76 are perforated with numerous holes 80 in order to permit gas flow through the retainer assemblies 52 and 54 and through the bed 40.

As is normal, the molecular sieve material 40 breaks down a little in use. It then compresses, and the effect is for the length of the bed 42 to shorten in use. This tendency is further increased by the fact that the machine of the invention is intended for portable use in vehicles. As explained above, this shortening must be accommodated and the bed 40 kept immobile despite the creation of this very fine material due to the breakdown. Containing the bed of fine sieve material while keeping the bed immobile is an important improvement of the invention, and this resides primarily in the moving piston assembly 54 and especially the filter paper 78, (see FIG. 12).

The filters 78 and 70 serve a dual purpose. First, each filter paper contains the very fine sieve material. The cooperating screens can then have a more open pore size so as to not form an undue blockage against the air flow. Secondly, the filter papers provide seals which prevent the particles of the sieve bed from migrating to the right in FIG. 12 and to the left in FIG. 11 around the respective piston assembly 52 and 54. The diameter of the outer edge 82 of the piston 76 in cooperation with the thickness of the filter paper 78 forms an effective seal at the right end of the bed 40. An important discovery of the invention has to do with the fact that this piston 76 needs to move in one direction only, that is from right to left in use. It has been found that this filter paper forms a very effective seal and offers little resistance to motion in one direction, to the left, when it is made to a diameter slightly larger than the diameter of the edge 82 and is folded over as shown. The filter paper 78 in the moving retainer assembly 54 may be slightly larger than the companion filter paper 70.

Also, while a circular cross-section is shown for the bed 38 and its component parts, the invention is not limited in this manner, and other shapes can also be used.

Piston 76 was first fitted with an "O" ring similar to the "O" ring 66 of FIG. 11, but it was found that the very fine molecular sieve material was able to migrate into the sealing zone between the inside of the body 42 and the "O" ring and to deteriorate the "O" ring to the point that sieve material could migrate into the plenum space 62. In addition, the "O" ring was found to bind and not move as is necessary to take up the shortening of the length of the bed in use under urging of the spring 56.

Thus, an important improvement of the invention has to do with the simplification of these parts. By providing a simple folded over paper seal which moves in one direction only, that is, to take up the shortening of the bed in use. This has improved operation as well as reduced the cost and complexity of manufacture.

Yet another advantage of these paper seals is the ability to tolerate an unfinished or mill quality surface on the inside of the body 42 for cooperation with these paper seals. Since the paper can be folded and bunched as necessary in the folding over process, it can accommodated minor irregularities in the aluminum or other metal of the body 42. This is another substantial cost advantage for manufacturers. That is, the inside of the bed, the inside of the body 42, need not be finished, but can simply be used as it is provided by the mill where the tubing is made. The manufacturer, in making the bed, simply cuts off lengths of mill tubing as it is bought from the mill, machines the ends only, and fits the other parts described above to create the bed. The avoidance of these finishing operations on the inside of the tube is an important advantage for the invention as compared to the prior art. The prior art often included specially molded sizes, shapes and finishes of parts which added enormously to the expense of building and producing such prior art beds as compared to the simple sawed off lengths of ordinary aluminum tubing as is used in the present invention.

Yet another advantage of the ability to use simple sawed off lengths of conventional tubing is that a metal bed is thereby provided. A metal bed is deemed highly desirable from the point of view of durability in use and other advantages known to those skilled in these arts.

Because the filter papers 70 and 78 are exposed to the sieve material, the primary function of the screen 68 is a physical back-up for the paper so that the paper is not forced into the holes 80 in the two pistons. The pore size of the screens 68 is thus not critical.

Another aspect of the invention is its adaptability to use with a demand device to thus improve its efficiency. That is, by providing a device responsive to the user's inspiration efforts, the unit needs to supply oxygen only through a portion of the total operating time of use. That is, by not providing oxygen during the user's exhalation and rest periods, the machine can be made smaller and lighter and the total demand on the machine is reduced. An oxygen concentrator system including this feature is illustrated schematically in FIG. 13.

Figure 13:
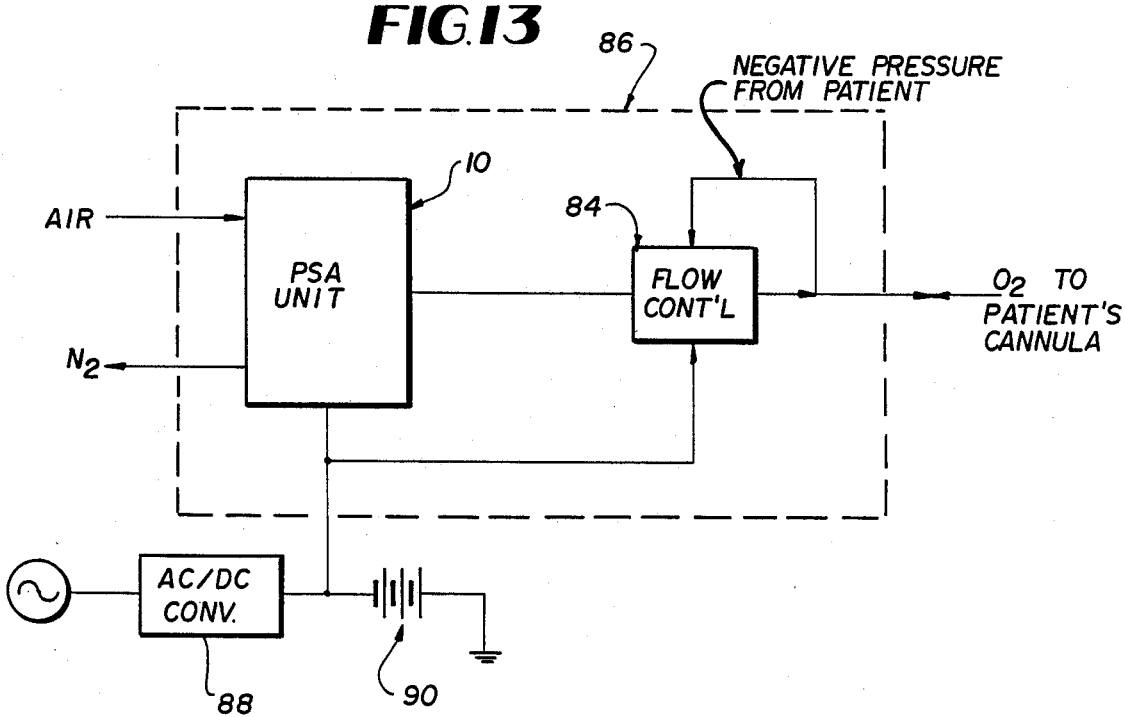
FIG. 13 is perspective view showing the manner of operation of the invention including the alternate power supply and the demand flow controller.

The PSA unit in this FIG. 13 system may be the invention unit 10 or any other PSA unit. The flow control device 84 may be that device described and claimed in detail in copending patent application Ser. No. 937,730 by Kenyon and Puckhaber, entitled "FLOW CONTROLLER", filed on Dec. 4, 1986, and assigned to the same assignee as the present invention. The invention can also be used with other such demand devices to control the oxygen flow to the patient's cannula, if such other devices will respond to the relatively weak inspirational efforts produced by a sick patient at a cannula. The two parts 10 and 84 are indicated in a dotted line box 86 because they comprise a single demand controlled PSA system.

Figure 4:
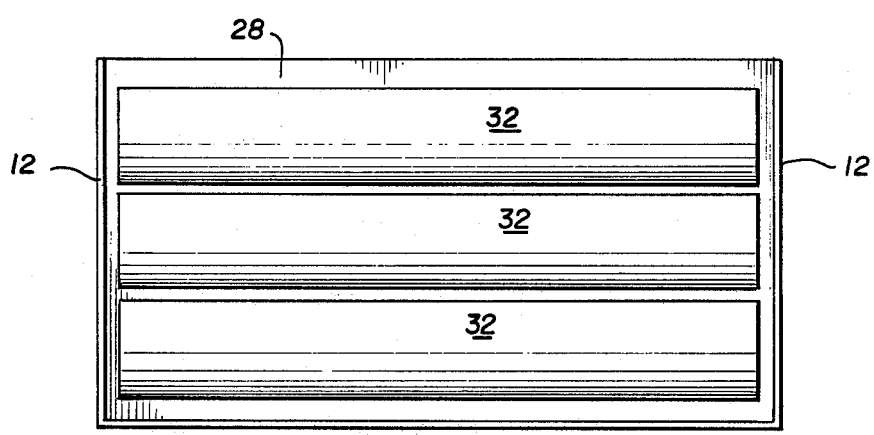
FIG. 4 is a front side elevational view looking in the direction of arrows 4—4 of FIG. 3.
Figure 5:
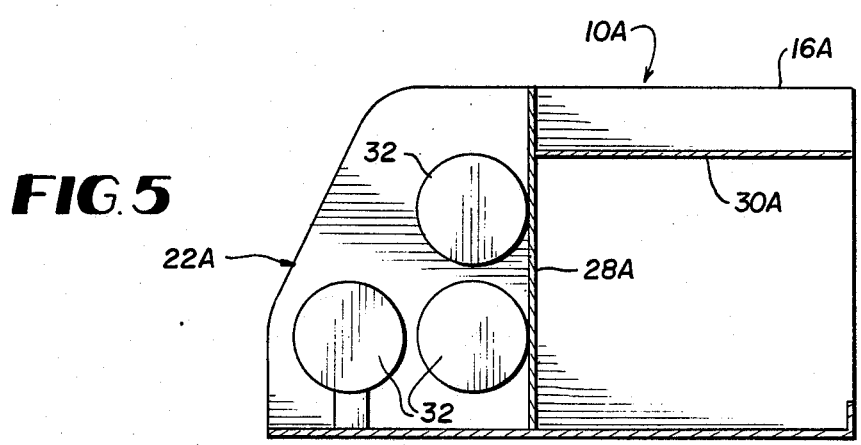
FIG. 5 is a view similar to FIG. 3 showing an alternate arrangement of the beds.

The showing of FIG. 4 is completed by the AC/DC converter 88, a battery 90 which may be an automobile battery, and, alternatively, a conventional source of AC power for the converter 88. This indicates the dual power capability of the machine 10 of the invention, and the preferred such capability of any other unit used in place of the unit 10 in the invention.

As described in detail in the above identified Kenyon and Puckhaber patent application, the demand device includes a demand sensor which may be external of the concentrator or which may be built-in. For average user demand, the concentrator used in the invention system need supply only 25% to 40% of that oxygen which would be required absent a demand device. This produces a nearly proportional reduction in size, weight, cost and power demand for the concentrator used in the invention system, as compared to the prior art.

While the invention has been described in some detail above, it is to be understood that this detailed description is by way of example only, and the protection granted is to be limited only within the spirit of the invention and the scope of the following claims.

What is claimed is:

1. A portable PSA machine having a relatively low profile and a relatively low center of gravity such that said machine will be stable against falling over when in use in moving vehicles, said machine including self-contained compressed air supply means, said machine comprising a plurality of beds of molecular sieve material, means to locate said beds in said machine in a horizontal orientation when said machine is in use in a vehicle, said machine comprising cabinet means, means to cool said machine, said cooling means comprising air inlet means and air outlet means positioned in a pair of opposed walls of said cabinet means, said cabinet means being elongated in one direction, said one direction being horizontal when said machine is in its normal use position, said opposed walls comprising those walls of said cabinet means at the ends of said elongated dimension, and the configuration of said machine being such that said machine will tend to be located in the foot well of an automobile with the air flow therethrough via said air inlet means and said outlet means from side to side of said automobile.

2. The machine of claim 1, said self-contained compressed air supply means comprising an electric motor-air compressor component, and said electric motor therein being a DC electric motor.

3. The machine of claim 2, said motor-air compressor component and said beds being located in said cabinet means generally side by side with respect to each other, whereby said low profile and said low center of gravity of said machine are enhanced.

4. The machine of claim 1, and handle means on said cabinet at the top thereof, said handle means being positioned parallel to said elongated dimension.

5. The machine of claim 1, means to mount said beds in said machine in a horizontal orientation, each of said beds including spring means adapted to hold sieve material therein immobile and filling the space in said bed during use of said machine in a vehicle and to take up any shortening of said sieve material which occurs during use of said PSA machine.

6. The machine of claim 5, each of said beds comprising a length of metal tubing, a pair of sealing end plate means positioned one at each of the ends of said tubing, a pair of sieve material retainer means inside said tubing positioned one in predetermined spaced relation to each of said end plate means, both of said end plate means being imperforate but being provided with gas flow fitting means to permit gas flow to, through and away from sieve material inside said tubing, each of said retainer means being so formed as to permit the flow of gas therethrough, and each of said retainer means including means to form a gas tight seal between the outermost portions thereof and the inside surface thereof.

7. The machine of claim 6, said sealing means comprising filter paper, said filter paper being formed to a shape corresponding to the mating shapes of said retainer means inside said tubing and of a size larger than the size of its respective retainer means and also larger than the mating size of the inside of said tubing, the portions of said filter paper larger than the size of the respective retainer means being folded over inside said tubing in a direction to permit motion of at least one of said retainer means in an appropriate direction to take up said shortening of molecular material inside said tubing due to the urging of said spring means.

8. The machine of claim 7, each of said retainer means including an assemblage of a piston member, a metal screen member, one of said filter papers, and retaining means securing together all of said piston members, said screen member, and said filter paper, and said folded over portions of said filter paper overlying said screen member and portions of said piston member.

9. The machine of claim 6, and said tubing including finished portions at both of its ends for cooperation with said end plate means and otherwise being of unfinished mill quality.

10. The machine of claim 6, said spring means being located between one of said retainer means and the closely spaced one of said end plates to thereby create a plenum space at the end of said bed associated with said one retainer and said one end plate, and spacer means between the other of said end plates and the other of said retainer means to thereby create a second plenum space at the other end of said bed.

11. The machine of claim 6, said bed further comprising a tie rod having a length greater than the length of said tubing, said tie rod passing axially through all of said pair of end plates and said pair of retainer means, said retainer means being substantially free to move axially on said tie rod, and means to fix the ends of said tie rod to the outer surfaces of said end plates to thereby hold said bed device assembled together.

12. The machine of claim 1, said machine being portable and including a DC motor.

13. The machine of claim 1, and a demand control device, a patient's cannula or demand mask, said machine concentrating oxygen out of air, and said demand control device comprising means to permit the flow of said oxygen via said cannula or said demand mask to the patient only in response to respiration inspirational efforts of the patient.

14. A PSA machine comprising at least one bed device to hold molecular sieve material, said machine comprising self-contained compressed air supply means and means to cool said machine, means to mount said at least one bed in said machine in a horizontal orientation, and spring means within said bed adapted to hold sieve material therein immobile and filling the space in said bed device during use of said machine and to take up any shortening of said sieve material which occurs during use of said PSA machine.

15. The machine of claim 14, said bed device comprising a length of metal tubing, a pair of sealing end plate means positioned one at each of the ends of said tubing, a pair of sieve material retainer means inside said tubing positioned one in predetermined spaced relation to each of said end plate means, both of said end plate means being imperforate but being provided with gas flow fitting means to permit gas flow to, through and away from sieve material inside said tubing, each of said retainer means being so formed as to permit the flow of gas therethrough, and each of said retainer means including means to form a gas tight seal between the outermost portions thereof and the inside surface thereof.

16. The machine of claim 15, said sealing means comprising filter paper, said filter paper being formed to a shape corresponding to the mating shapes of said retainer means inside said tubing and of a size larger than the size of its respective retainer means and also larger than the mating size of the inside of said tubing, the portions of said filter paper larger than the size of the respective retainer means being folded over inside said tubing in a direction to permit motion of at least one of said retainer means in an appropriate direction to take up said shortening of molecular material inside said tubing due to the urging of said spring means.

17. The machine of claim 16, each of said retainer means including an assemblage of a piston member, a metal screen member, one of said filter papers, and retaining means securing together all of said piston members, said screen member, and said filter paper, and said folded over portions of said filter paper overlying said screen member and portions of said piston member.

18. The machine of claim 15, and said tubing including finished portions at both of its ends for cooperation with said end plate means and otherwise being of unfinished mill quality.

19. The machine of claim 15, said spring means being located between one of said retainer means and the closely spaced one of said end plates to thereby create a plenum space at the end of said bed associated with said one retainer and said one end plate, and spacer means between the other of said end plates and the other of said retainer means to thereby create a second plenum space at the other end of said bed device.

20. The machine of claim 15, said bed device further comprising a tie rod having a length greater than the length of said tubing, said tie rod passing axially through all of said pair of end plates and said pair of retainer means, said retainer means being substantially free to move axially on said tie rod, and means to fix the ends of said tie rod to the outer surfaces of said end plates to thereby hold said bed device assembled together.

21. The machine of claim 14, said machine being portable, including a DC motor, and being adapted for use in a foot well of an automobile and under an air liner seat.

22. The machine of claim 14, said machine having a relatively low profile and a relatively low center of gravity such that said machine will be stable against falling over when in use in moving vehicles, said machine comprising a plurality of said beds, means to locate said beds in said machine in a horizontal orientation when said machine is in use in a vehicle, said machine comprising cabinet means, said means to cool comprising air inlet means and air outlet means positioned in a pair of opposed walls of said cabinet means, said cabinet means being elongated in one direction, said one direction being horizontal when said machine is in its normal use position, said opposed walls comprising those walls of said cabinet means at the ends of said elongated dimension, and the configuration of said machine being such that said machine will tend to be located in the foot well of an automobile with the air flow therethrough via said air inlet means and said air outlet means from side to side of said automobile.

23. The machine of claim 22, said machine comprising an electric motor-air compressor component, and said electric motor therein being a DC electric motor.

24. The machine of claim 23, said motor-air compressor component and said beds being located in said cabinet means generally side by side with respect to each other, whereby said low profile and said low center of gravity of said machine are enhanced.

25. The machine of claim 22, and handle means on said cabinet means at the top thereof, said handle means being positioned parallel to said elongated dimension.

26. The machine of claim 14, said machine concentrating oxygen out of air, a demand control device, a patient's cannula or demand mask, said machine being of a relatively low profile and having a relatively low center of gravity such that said machine is stable against falling over when used in moving vehicles, and said demand contol device comprising means to permit the flow of oxygen via said cannula or said demand mask to the patient only in response to the respiration inspirational efforts of the patient.

27. The machine of claim 14, said means to cool comprising air inlet means and air outlet means so positioned that the flow of air therethrough will be normally from side to side of an automobile when said machine is positioned in a foot well of an automobile.

28. The machine claim 27, and handle means so positioned on said machine that said machine will tend to be located in said foot well in said desired position with the air flow therethrough from side to side of said automobile.

29. A portable PSA oxygen concentrator system, said system comprising an oxygen concentrator, said oxygen concentrator comprising self-contained compressed air supply means, a demand control device, and a patient's cannula or demand mask, said oxygen concentrator being of a relatively low profile and having a relatively low center of gravity such that said oxygen concentrator system is stable against falling over when used in moving vehicles, and said demand control device comprising means to permit the flow of oxygen from said concentrator via said cannula or said demand mask to the patient only in response to the respiration inspirational efforts of the patient.

30. The system of claim 29, said concentrator comprising a plurality of beds of molecular sieve material, means to locate said beds in said concentrator in a horizontal orientation when said machine is in use in a vehicle, and said concentrator comprising means to cool said concentrator, said cooling means comprising air inlet means and air outlet means so positioned on said concentrator that the flow of air therethrough will be normally from side to side of an automobile when said concentrator is positioned in a foot well of said automobile.

31. The system of claim 30, and handle means on said concentrator, and said handle means being so positioned that said concentrator will tend to be located in said foot well in said desired position with the air flow therethrough from side to side of said automobile.

32. The system of claim 29, and oxygen concentrator comprising cabinet means, means to cool said concentrator, said cooling means comprising air inlet means and air outlet means positioned in a pair of opposed walls of said cabinet means, said cabinet being elongated in one direction, said one direction being horizontal when said oxygen concentrator is in its normal use position, said opposed walls comprising those walls of said cabinet means at the ends of said elongated dimension, and the configuration of said oxygen concentrator being such that said oxygen concentrator will tend to be located in the foot well of an automobile with the air flow therethrough via said air inlet means and said air outlet means from side to side of said automobile.

33. The system of claim 32, said oxygen concentrator comprising an electric motor-air compressor component, and said electric motor therein being a DC electric motor.

34. The system of claim 33, said motor-air compressor component and said beds being located in said cabinet in a generally side by side position with respect to each other, whereby said low profile and said low center of gravity of said oxygen concentrator are enhanced.

35. The system of claim 29, said oxygen concentrator comprising at least one bed device to hold molecular sieve material, means to mount said at least one bed in said oxygen concentrator in a horizontal orientation, and spring means within said bed adapted to hold sieve material therein immobile and filling the space in said bed device during use of said oxygen concentrator in vehicles and to take up any shortening of said sieve material which occurs during use of said bed device in said oxygen concentrator.

36. The system of claim 55, said bed comprising a length of metal tubing, a pair of sealing end plate means positioned one at each of the ends of said tubing, a pair of sieve material retainer means inside said tubing positioned one in predetermined spaced relation to each of said end plate means, both of said end plate means being imperforate but being provided with gas flow fitting means to permit gas flow to, through and away from sieve material inside said tubing, each of said retainer means being so formed as to permit the flow of gas therethrough, and each of said retainer means including means to form a gas tight seal between the outermost portions thereof and the inside surface thereof.

37. The system of claim 36, said sealing means comprising filter paper, said filter paper being formed to a shape corresponding to the mating shapes of said retainer means inside said tubing and of a size larger than the size of its respective retainer means and also larger than the mating size of the inside of said tubing, the portions of said filter paper larger than the size of the respective retainer means being folded over inside said tubing in a direction to permit motion of at least one of said retainer means in an appropriate direction to take up shortening of molecular material inside said tubing due to the urging of said spring means.

38. The system of claim 37, each of said retainer means including an assemblage of a piston member, a metal screen member, one of said filter papers, and retaining means securing together all of said piston members, said screen member, and said filter paper, and said folded over portions of said filter paper overlying said screen member and portions of said piston member.

39. The system of claim 36, and said tubing including finished portions at both of its ends for cooperation with said end plate means and otherwise being of unfinished mill quality.

40. The system of claim 36, said spring means being located between said at least one retainer and the closely spaced one of said end plates to thereby create a plenum space at said end of said bed, and spacer means between the other of said end plates and the other of said retainer means to thereby create a second plenum space at the other end of said bed.

41. The system of claim 36, said bed device further comprising a tie rod having a length greater than the length of said tubing, said tie rod passing axially through all of said pair of end plates and said pair of retainer means, said retainer means being substantially free to move axially on said tie rod, and means to fix the ends of said tie rod to the outer surfaces of said end plates to thereby hold said bed device assembled together.

42. The system of claim 29, said oxygen concentrator including a DC motor, and said system being adapted for use in a foot well of an automobile and under an air liner seats.

* * * * *